United States Patent [19]
Wood, Jr.

[11] Patent Number: 5,397,635
[45] Date of Patent: Mar. 14, 1995

[54] MULTI-LAYER HIGH OPACITY FILM STRUCTURE OF IMPROVED WHITENESS AND MACHINABILITY

[75] Inventor: Ronald C. Wood, Jr., Pittsford, N.Y.

[73] Assignee: Mobil Oil Corporation, Fairfax, Va.

[21] Appl. No.: 51,713

[22] Filed: Apr. 23, 1993

Related U.S. Application Data

[62] Division of Ser. No. 776,520, Oct. 11, 1991, Pat. No. 5,209,884.

[51] Int. Cl.⁶ .......................... B32B 3/26; B32B 5/16; B29C 67/20
[52] U.S. Cl. .................. 428/314.4; 428/315.5; 428/317.9; 428/483
[58] Field of Search ............... 428/485, 516, 314.4, 428/315.5, 317.9, 910

[56] References Cited

U.S. PATENT DOCUMENTS

| | | | |
|---|---|---|---|
| 3,697,367 | 10/1972 | Schwarz | 161/168 |
| 3,795,720 | 5/1974 | Schwarz | 264/41 |
| 4,118,438 | 10/1978 | Matsui et al. | 260/857 L |
| 4,377,616 | 3/1983 | Ashcraft et al. | 428/213 |
| 4,533,509 | 8/1985 | Gust et al. | 264/171 |
| 4,560,614 | 12/1985 | Park | 428/317.9 |
| 4,582,753 | 4/1986 | Duncan | 428/317.9 |
| 4,632,869 | 12/1986 | Park et al. | 428/315.5 |
| 4,652,489 | 3/1987 | Crass et al. | 428/337 |
| 4,681,803 | 7/1987 | Liu | 428/348 |
| 4,702,370 | 10/1987 | Park | 428/314.4 |
| 4,702,954 | 10/1987 | Duncan | 428/213 |
| 4,741,950 | 5/1988 | Liu | 428/315.5 |
| 4,758,462 | 7/1988 | Park et al. | 428/213 |
| 4,965,123 | 10/1990 | Swan et al. | 428/314.4 |
| 4,968,464 | 11/1990 | Kojoh et al. | 264/41 |
| 5,066,434 | 11/1991 | Liu et al. | 264/37 |
| 5,091,236 | 2/1992 | Keller et al. | 428/213 |

FOREIGN PATENT DOCUMENTS

| | | | |
|---|---|---|---|
| 3521328 | 12/1986 | Germany | 264/210.7 |
| 3532884 | 3/1987 | Germany | 264/210.6 |

*Primary Examiner*—P. C. Sluby
*Attorney, Agent, or Firm*—Alexander J. McKillop; Malcolm D. Keen; Jessica M. Sinnott

[57] ABSTRACT

A multi-layer opaque, biaxially oriented polymeric film structure. The film structure includes a thermoplastic polymer matrix core layer having a first surface and a second surface, within which is located a strata of voids, positioned at least substantially within a substantial number of the voids is at least one spherical void-initiating particle which is phase distinct and incompatible with the matrix material, the void space occupied by the particle being substantially less than the volume of the void, the population of the voids in the core being such as to cause a significant degree of opacity, a first thermoplastic polymer skin layer having a first surface and a second surface, the first surface of the first skin layer adhering to the first surface of the core layer, the first skin layer including up to about 12% by weight of titanium dioxide contact pigment, and a second thermoplastic polymer skin layer having a first surface and a second surface, the first surface of the second skin layer adhering to the second surface of the core layer, the second skin layer including finely divided, uniformly dispersed inorganic material in an amount effective to impart antiblocking characteristics and decrease the inherent film-to-film coefficient of friction at the second surface of the second thermoplastic polymer skin layer.

10 Claims, 1 Drawing Sheet

MULTI-LAYER HIGH OPACITY FILM STRUCTURE OF IMPROVED WHITENESS AND MACHINABILITY

This is a division of application Serial No. 7/776,520, filed on Oct. 11, 1991, now U.S. Pat. No. 5,209,884.

FIELD OF THE INVENTION

This invention relates to the field of polymer films of enhanced opacity and to a method of making such films. More particularly, the invention relates to a biaxially oriented composite film structure having improved properties.

BACKGROUND OF THE INVENTION

In the packaging of certain types of foods, such as snack foods like potato chips, cookies and the like, it is common practice to employ a multi-layer film. A desirable property in such a packaging film is an opacity which protects the packaging product from deterioration caused by exposure to light. In particular, it has been found that certain wavelengths of light, up to about 450 nm cause increased spoilage in such packaged products. Even when a degree of opacity is present in the film, spoilage occurs if the film allows passage of some light.

It is known in the art that thermoplastic polymers can be loaded with inert fillers, cast into films, and thereafter stretched to form oriented thermoplastic films. While this statement is generally true, it must be realized that the particular components employed and the specific process parameters employed, particularly when control is difficult, can result in significantly different end products or contribute to the success or failure of obtaining a desired result. As an example, U.S. Pat. No. 4,118,438, discloses the use of some materials similar to those contemplated by the present invention, however, the object of U.S. Pat. No. 4,118,438 is diametrically opposed to the object of the present invention. U.S. Pat. No. 4,118,438 is concerned with a transparent polypropylene film containing fine particles of an incompatible polymer dispersed therein. The film disclosed exhibits surface projections caused by the dispersed particles and the patentees maintain that this gives the transparent film non-blocking characteristics. In U.S. Pat. Nos. 3,697,367 and 3,795,720, there is disclosed a process for preparing an uniaxially oriented mixed polymer system. The resulting material has utility as a paper substitute and can be formed into fibers for making sheet paper.

Oriented opaque film compositions are known in the art. U.S. Pat. No. 4,377,616 discloses an opaque biaxially oriented polymer film structure comprising a thermoplastic polymer matrix core possessing numerous voids, a substantial number of which contain at least one spherical void-initiating particle, and transparent thermoplastic skin layers adhering to the surfaces of the core layer. The unique structure of the core layer imparts a much higher degree of opacity, possibly due to the effects of light scattering, than that possible from the use of an opacifying pigment alone. In U.S. Pat. No. 4,377,616, the film is prepared by melting a mixture of a major proportion of a film forming polymer such as polypropylene and a minor proportion of an incompatible polymer which has a higher melting point, at a temperature sufficient to melt the incompatible polymer and to disperse it in the film forming polymer, extruding the mixture into a film and biaxially orienting the film. The dispersed incompatible polymer provides sites for the formation of voids surrounding the polymer particles. These voids provide opacity and give the film an attractive pearlescent sheen.

U.S. Pat. No. 4,533,509 discloses a composite oriented structure having at least one thin surface layer containing highly subdivided inorganic material in an antiblock and coefficient of friction reducing proportion, the thin layer being formed simultaneously or sequentially on a comparatively thick base layer and thereafter oriented.

U.S. Pat. No. 4,632,869 discloses an opaque, biaxially oriented film structure having a polymer matrix with a strata of voids, the voids containing spherical void-initiating particles of polybutylene terephthalate. The structure may also include thermoplastic skin layers and the film can include from about 1% to 3% by weight of a pigment such as $TiO_2$ or colored oxides.

U.S. Pat. No. 4,652,489 discloses an oriented, sealable, opaque polyolefin multi-layer film with a core layer containing vacuoles, a sealable surface layer, and a non-sealable surface layer which incorporates a slip agent such as a polydiorganosiloxane.

U.S. Pat. No. 4,741,950 discloses a differential opaque polymer film with a core layer containing numerous microscopic voids, a rough-appearing wettable first skin layer which contains an antiblocking agent such as silica, silicate, clay, diatomaceous earth, talc and glass, and a second wettable skin layer with a smooth appearance which may be metallized. $TiO_2$ may be present in the core and/or first skin layer. The film allows a light transmission of 24%.

U.S. Pat. No. 4,758,462 also discloses an opaque, biaxially oriented film with a cavitated core and transparent skin layers. Colored light absorbing pigments such as carbon black or iron oxide are added to the core and/or the skins in an amount of about 2 to 12 weight % to decrease light transmission through the film.

U.S. application Ser. No. 07/324,134, a co-inventor of which is also the inventor of the present invention, disclosed a non-symmetrically layered, highly opaque, biaxially oriented polymer film with a core containing numerous microscopic voids and at least about 1% by weight of opacifying compounds; a first skin layer on one surface of the core containing up to about 12% by weight of inorganic particulate material; and a second skin layer on the other surface of the core. U.S. application Ser. No. 07/324,134, also discloses the benefit which accrues from the addition of inorganic particles such as titanium dioxide to whiten the surface of the outer skin layer of the film structure. The increase in whiteness yields an excellent surface for printed graphics. A further benefit resulting from increased whiteness in the outer skin layer of the film is that it permits the printing of laminated or unlaminated film structures without the need for white ink, offering a significant savings to the end user. Ser. No. 07/324,134 filed on Mar. 15, 1989 is now abandoned. However, Ser. No. 07/710,234 filed on Jun. 3, 1991 is now U.S. Pat. No. 5,176,954. Ser. No. 07/710,234 is a continuation of Ser. No. 07/456,066, filed on Dec. 21, 1989, now abandoned, which is a continuation of Ser. No. 07/324,134.

Despite these advances in the art, a need still exists for a film structure of high opacity which provides improved processing characteristics and machinability, while also providing high whiteness, strength and stiffness.

SUMMARY OF THE INVENTION

The film structure of the present invention is an opaque, biaxially oriented polymeric film. The film structure includes (a) a thermoplastic polymer matrix core layer having a first surface and a second surface, within which is located a strata of voids, positioned at least substantially within a substantial number of the voids is at least one spherical void-initiating particle which is phase distinct and incompatible with the matrix material, the void space occupied by the particle being substantially less than the volume of the void, the population of the voids in the core being such as to cause a significant degree of opacity, (b) a first thermoplastic polymer skin layer having a first surface and a second surface, the first surface of the first skin layer adhering to the first surface of the core layer, the first skin layer including up to about 12% by weight of titanium dioxide contact pigment, and (c) a second thermoplastic polymer skin layer having a first surface and a second surface, the first surface of the second skin layer adhering to the second surface of the core layer, the second skit layer including finely divided, uniformly dispersed inorganic material in an amount effective to impart antiblocking characteristics and decrease the inherent film-to-film coefficient of friction at the second surface of the second thermoplastic polymer skin layer, wherein the skin layers are of a thickness such that the outer surface of the skin layers do not, at least substantially, manifest the surface irregularities of said matrix core layer.

The skin layers (b) and/or (c) can be simple, economical thin encapsulating layers or they can be more elaborate heat sealable layers. The skin layers are of a thickness such that the outer surface of the skin layers do not, at least substantially, manifest surface the irregularities of the matrix core layer.

Also provided is a process for preparing an opaque, biaxially oriented polymeric film structure, comprising the steps of: (a) mixing a major proportion of a first thermoplastic polymeric material with a minor proportion of a first material of higher melting point or having a higher glass transition temperature than the first thermoplastic polymeric material to produce a core layer mixture; (b) heating the core layer mixture produced in step (a) to a temperature of at least above the melting point of the first thermoplastic polymeric material; (c) dispersing the first material of higher melting point or higher glass transition temperature of the mixture produced in step (a) uniformly throughout the molten first thermoplastic polymeric material in the form of microspheres; (d) mixing a second thermoplastic polymeric material with titanium dioxide contact pigment to produce a first skin layer mixture; (e) heating the first skin layer mixture produced in step (d) to a temperature of about the melting point of the second thermoplastic polymeric material; (f) mixing a third thermoplastic polymeric material with a finely divided, inorganic material to produce a second skin layer mixture; (g) heating the second skin layer mixture produced in step (f) to a temperature of about the melting point of the third thermoplastic polymeric material; and (h) forming a biaxially oriented coextruded film structure from the core layer mixture, the titanium dioxide-containing first skin layer mixture and the inorganic material-containing second skin layer mixture, the forming step conducted at a temperature and to a degree to form a strata of opacifying voids within the core layer; wherein the inorganic material of the second skin layer imparts antiblocking characteristics and reduced inherent film-to-film coefficient of friction at its surface.

Accordingly, it is an object of the present invention to provide a film structure of high opacity.

It is another object of the present invention to provide a film with improved machinability.

It is a further object of the present invention to provide a film structure having an improved range of process operability.

It is yet another object of the present invention to provide a film which may be bonded to a wide variety of substrates and coatings.

It is a yet further object of the present invention to provide a multi-layer film structure of high whiteness.

Other objects and the several advantages of the present invention will become apparent to those skilled in the art upon reading of the specification and the claims appended thereto.

DETAILED DESCRIPTION OF THE INVENTION

In order to achieve the unique film structure of the present invention, it is important that a particular thickness relationship exist between the thickness dimension of the core and the thickness of the skin layers. It is preferred that the core thickness be from about 60 to about 95% of the overall structure with about 65-90% preferred. This in combination with the population and configuration of the voids in a total structure at least about 1.0 mil thick, will materially contribute to the overall degree of opacity of the structure. Likewise, by maintaining the thickness of the skin layers within particular ranges in relation to the overall structure and to the thickness of the core layer, the overall combination results in unique advantages. First skin layer (b), adhering to the first surface of core layer (a) and second skin layer (c) adhering to the second surface of core layer (a) each have a thickness of from about 5 to about 30% of the overall structure, with a thickness of about 5 to about 15% preferred. These layers also serve an important function in reducing water vapor transmission rate (WVTR). The core is a thermoplastic polymer matrix material within which is located strata of voids. From this it is to be understood that the voids create the matrix configuration.

The films of the present invention provide high opacity and low light transmission. A distinction should be made between opacity and light transmission. Opacity is the opposite of transparency and is a function of the scattering and reflection of light transmitted through the film. Opacity is the ability, for example, to block out writing below it. Light transmission is a function of light passing more directly through the film.

Figure 1:
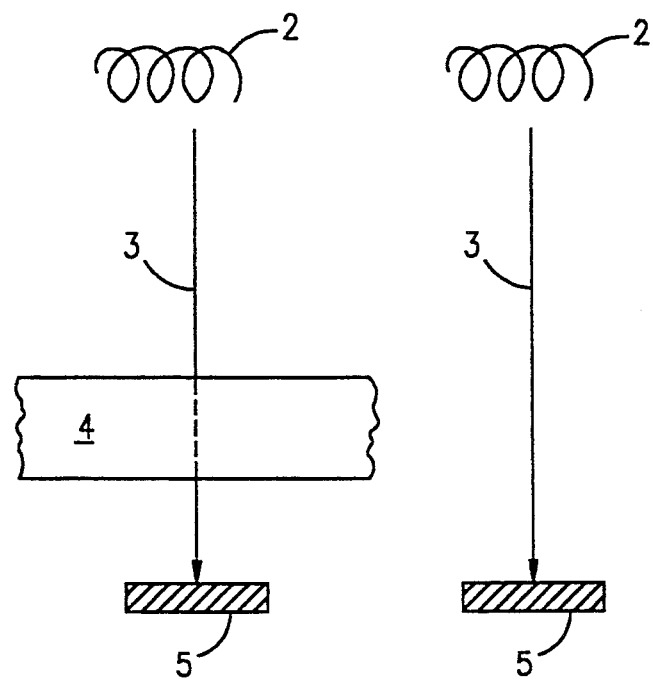
FIG. 1 is a schematic diagram of a method for determining percent light transmission.

Referring now to FIG. 1, the percent light transmission through a film is determined by using light source 2 to transmit light rays 3 directly through film 4 and measuring at light sensor 5, value $T_2$ which is the amount of light which is transmitted through film 4. The amount of light rays 3 which can be directly transmitted, value $T_1$, is determined by measuring the light 3 directly transmitted by light source 2 with no intervening film. The percent light transmission through the film can then be determined using the formula:

$$\% \text{ Light Transmission} = \frac{T_2}{T_1}$$

where: $T_2$ = light transmitted through a film; and $T_1$ = light directly transmitted.

Figure 2:
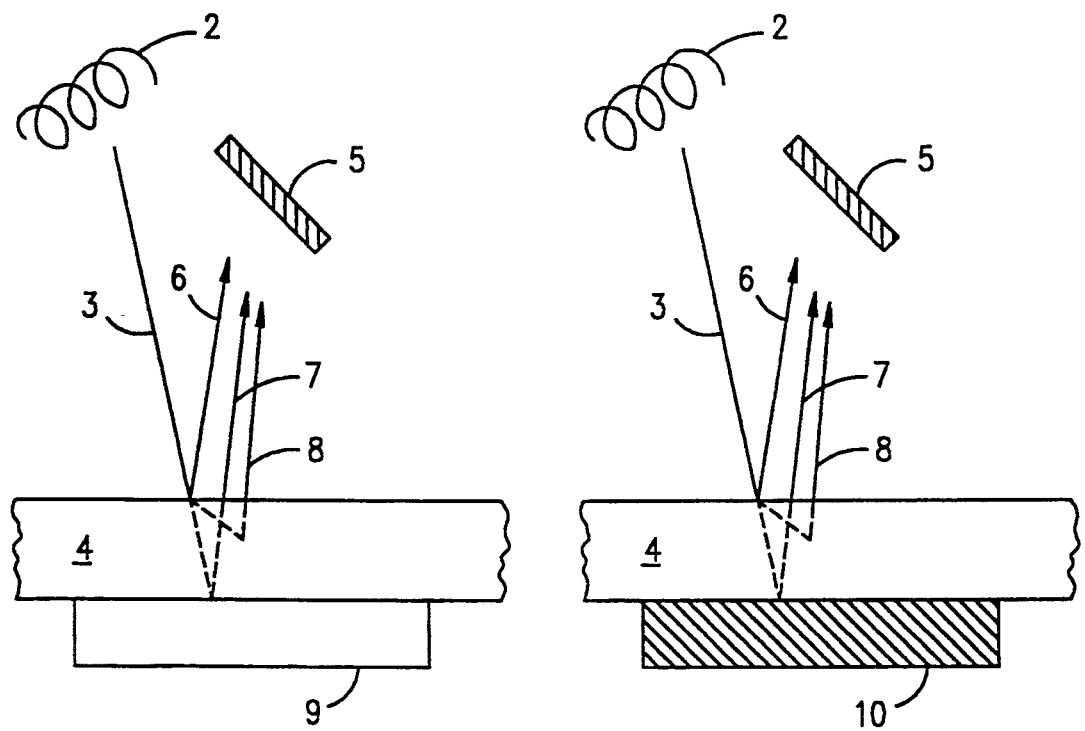
FIG. 2 is a schematic diagram of a method for determining percent opacity.

Referring now to FIG. 2, for a measure of percent opacity of a film, light source 2 transmits light through film 4 onto a white surface 9 and the same procedure used to project light onto a black surface 10. With both white and black surfaces, measurement at light sensor 5 is of all of the following: light reflected off the upper surface of the film 6; light transmitted through the film and reflected by the white or black surfaces 7 on the side of the film opposite from the light source; and, light scattered by the film 8.

The percent opacity of the film can then be determined using the formula:

$$\% \text{ Opacity} = 100 \times \frac{R_B}{R_w}$$

where: $R_w$ = Reflected light + scattered light + light transmitted through the film and reflected off a white surface; and $R_B$ = Reflected light + scattered light + light transmitted through the film and reflected off a black surface.

Accordingly, a highly reflective film may provide high opacity while allowing light transmission. This is because percent light transmission is not the equivalent of percent opacity. Light transmission is the amount of light passing directly through the film. To prevent food spoilage decreased light transmission is desirable.

In forming the core layer, as in U.S. Pat. No. 4,377,616, the disclosure of which is incorporated herein by reference in its entirety, a master batch technique can be employed by either in the case of forming the void initiating particles in situ or in adding preformed spheres to a molten thermoplastic matrix material. After the formation of a master batch, appropriate dilution of the system can be made by adding additional thermoplastic matrix material until the desired proportions are obtained. However, the components may also be directly mixed and extruded instead of utilizing a master batch method.

The void-initiating particles which are added as filler to the polymer matrix material of the core layer can be any suitable organic or inorganic material which is incompatible with the core material at the temperature of biaxial orientation such as polybutylene terephthalate, nylon, solid or hollow preformed glass spheres, metal beads or spheres, ceramic spheres, calcium carbonate, etc.

The polyolefin contemplated as the core material includes polypropylene, polyethylene, polybutene and copolymers and blends thereof. Particularly preferred is an isotactic polypropylene containing at least about 80% by weight of isotactic polypropylene. It is also preferred that the polypropylene have a melt flow index of from about 2 to 10 g/10 min.

It is preferred that the average diameter of the void-initiating particles be from about 0.1 to about 10 microns. These particles may be of any desired shape although it is preferred that they be substantially spherical in shape. This does not mean that every void is the same size. It means that, generally speaking, each void tends to be of like shape when like particles are used even though they vary in dimensions. These voids may assume a shape defined by two opposed and edge contacting concave disks.

Experience has shown that optimum characteristics of opacity and appearance are obtained when the two average major void dimensions are greater than about 30 microns.

The void-initiating particle material, as indicated above, should be incompatible with the core material, at least at the temperature of biaxial orientation.

The core has been described above as being a thermoplastic polymer matrix material within which is located a strata of voids. From this it is to be understood that the voids create the matrix configuration. The term "strata" is intended to convey the understanding that there are many voids creating the matrix and the voids themselves are oriented so that the two major dimensions are aligned in correspondence with the direction of orientation of the polymeric film structure. After each void has been formed through the initiation of the described particle, the particle generally contributes little else to the system. This is because its refractive index can be close enough to the matrix material that it makes no contribution to opacity. When this is the case, the opacity is principally a function of the light scattering effect which occurs because of the existence of the voids in the system.

A typical void of the core is defined as having major dimensions X and Y and minor dimension Z, where dimension X is aligned with machine direction orientation, dimension Y is aligned with transverse direction orientation and dimension Z approximately corresponds to the cross-sectional dimension of the spherical particle which initiated the void.

It is a necessary part of the present invention that orientation conditions be such that the X and Y dimensions of the voids of the core be major dimensions in comparison to the Z dimension. Thus, while the Z dimension generally approximates the cross-sectional dimension of the spherical particle initiating the void, X and Y dimensions must be significantly greater.

By way of illustration, room temperature biaxial orientation of a polypropylene matrix containing polybutylene terephthalate (PBT) spheres of the size and amount contemplated herein, could not produce the claimed structure. Either void splitting will occur, or, voids of insignificant size would result. Polypropylene must be oriented at a temperature significantly higher than its glass transition temperature. The temperature conditions must permit X and Y to be at least severa multiples of the Z dimension without void splitting at least to any significant degree. If this is accomplished, optimum physical characteristics, including low water vapor transmission rates and a high degree of light scattering are obtained without void splitting or film fibrillating.

As indicated above, the matrix polymer and the void initiating particle must be incompatible and this term is used in the sense that the materials are two distinct phases. The spherical void initiating particles constitute a dispersed phase throughout the lower melting polymer which polymer will, ultimately, upon orientation, become a void-filled matrix with the spherical particles positioned somewhere in the voids.

As a result of the biaxial orientation of the film structure herein, in addition to opacifying the core layer of the structure, the orientation improves other physical properties of the composite layers such as flex-crack resistance, Elmendorff tear strength, elongation, tensile strength, impact strength and cold strength properties. The resulting film can have, in addition to a rich high quality appearance and excellent opacifying characteristics, low water vapor transmission rate characteristics and low oxygen transmission rate characteristics. This makes the film ideally suited for packaging food products including liquids. The film also has attractive utility as a decorative wrap material.

It is believed that because of comparative sphericity of the void-initiating particles, the voids are closed cells. This means that there is virtually no path open from one side of the core the other throughout which liquid or gas can transverse.

The opacity and low light transmission of the film is further enhanced by the addition to the core layer of from about 1% by weight and up to about 10% by weight of opacifying compounds, which are added to the melt mixture of the core layer before extrusion. Opacifying compounds which may be used include iron oxides, carbon black, aluminum, $TiO_2$, and talc. The opacifying compounds do not contribute to void formation.

The polyolefin contemplated as the material for use in forming skin layers (b) and (c) includes polypropylene, polyethylene, including high density polyethylene, linear low density polyethylene, polybutene and copolymers, including block copolymers of ethylene and propylene, random copolymer of ethylene and propylene, other ethylene homopolymer, copolymer, terpolymer; or blends thereof. The homopolymer contemplated herein is formed by polymerizing the respective monomer. This can be accomplished by bulk or solution polymerization, as those skilled in the art would plainly understand.

The copolymer contemplated herein for skin layers (b) and/or (c) can be selected from those copolymers typically employed in the manufacture of multi-layered films. For example, a block copolymer of ethylene and propylene is formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from the preceding stage is sufficiently low to prevent formation of an excessive proportion of random copolymer. Also, as indicated above, a random copolymer of ethylene and propylene can be advantageously employed to form skin layers (b) and/or (c).

The contemplated terpolymers which may be used for skin layers (b) and/or (c) are comparatively low stereoregular polymers. The terpolymers can have a melt flow rate at 446° F. ranging from about 2 to about 10 grams per 10 minutes and preferably from about 4 to about 6 grams per 10 minutes. The crystalline melting point can range from about less than 250° F. to somewhat greater than 371° F. The terpolymers will predominate in propylene, and the ethylene and 1-butene monomers can be present in approximately from 0.3:1-1:1 mole percentage in relation to each other.

As was the case for the core layer, particularly preferred is an isotactic polypropylene containing at least about 80% by weight of isotactic polypropylene. It is also preferred that the polypropylene have a melt flow index of from about 2 to 10 g/10 m The opacity, whiteness and low light transmission of the film is further enhanced by the addition to the first skin layer (b) of $TiO_2$ in amount of from about 1% by weight and up to about 12% by weight, which is added to the melt mixture of the intermediate layer before extrusion. Preferably, the first skin layer (b) contains from about 2% by weight to 6% by weight of $TiO_2$. Additionally, this layer may also contain talc. The whiteness resulting from the inclusion of $TiO_2$ provides an excellent surface for graphics. Furthermore, the whiteness allows printing of laminated or unlaminated structures without requiring white ink.

The processability and machinability of the film is enhanced by the inclusion of a small percentage of finely subdivided inorganic material in the polyolefin material used to form skin layer (c). Such inorganic material not only can impart antiblock characteristics to the multi-layer film structure of the present invention, but also can reduce the coefficient of friction of the resultant film without imparting objectionable haze to the structure.

Contemplated finely divided inorganic materials, referred to above, include, syloid, a synthetic amorphous silica gel, having a composition of 99.7% $SiO_2$, diatomaceous earth having a composition of, for example, $SiO_2$ 92%, $Al_2O_3$ 3.3%, $Fe_2O_3$ 1.2%, which has an average particle size of about 5.5 microns, which particles are porous and irregularly shaped; dehydrated kaolinite (Kaopolite SF) having the composition $SiO_2$ 55%, $Al_2O_3$ 44%, $Fe_2O_3$ 0.4% which has an average particle size of about 0.7 microns which particles are thin flat platelets; and synthetic precipitated silicates (Sipsmat 44), for example, having a composition of $SiO_2$ 42%, $Al_2O_3$ 36%, $Na_2O$ 22%, which has an average particle size of about 3-4 microns which the particles are porous and irregularly shaped.

The polyolefin blends used to coextrude the multilayer high opacity film structures contemplated herein are formed by employing a commercially available intensive mixer, such as those of the Bolling- or Banbury-type. Mixers of this type are to be employed in mixing a concentrate of the finely divided inorganic material and the selected polymer until there is a uniform dispersion of the inorganic material in the polymer.

If desired, the exposed surface of skin layers (b) and/or (c) can be treated in a known and conventional manner, e.g., by corona discharge to improve its receptivity to printing inks and/or its suitability for such subsequent manufacturing operations as lamination.

The exposed treated or untreated surface of layers (b) and/or (c) may have applied to it, coating compositions or substrates such as another polymer film or laminate; a metal foil such as aluminum foil; cellulosic webs, e.g. numerous varieties of paper such as corrugated paperboard, craft paper, glassins, cartonboard; nonwoven tissue, e.g., spunbonded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like.

Skin layers (b) and/or (c) can also be fabricated from any of the heat sealable copolymers, blends of homopolymers and blends of copolymer(s) and homopolymer(s) heretofore employed for this purpose. Illustrative of heat sealable copolymers which can be used in the present invention are ethylene-propylene copolymers containing from about 1.5 to about 10, and preferably from about 3 to about 5 weight percent ethylene and ethylene-propylene-butene terpolymers containing from about 1 to about 10, and preferably from about 2 to about 6 weight percent ethylene and from about 80 to about 97, and preferably from about 88 to about 95 weight percent propylene. Heat sealable blends of homopolymer which can be utilized in providing layers (b) and/or (c) include from about 1 to about 99 weight percent polypropylene homopolymer, e.g., one which is the same as, or different from, the polypropylene homopolymer constituting core layer (a) blended with from about 99 to about 1 weight percent of a linear low density polyethylene (LDPE). If layers (b) and/or (c) are heat-sealable, corona or flame treatment of layers (b) and/or (c) is not required.

Heat sealable blends of copolymer(s) and homopolymer(s) suitable for providing layers (b) and/or (c) include: a blend of from about 5 to about 19 weight percent of polybutylene and from about 95 to about 81 weight percent of a copolymer of propylene (80 to about 95 mole percent) and butylene (20 to about 5 mole percent); a blend of from about 10 to about 90 weight percent of polybutylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent polybutylene and from about 90 to about 10 weight percent of a copolymer of ethylene (10 to about 97 mole percent) and propylene (90 to about 3 mole percent); and, a blend of from about 90 to about 10 weight percent of polybutylene, and from about 10 to about 90 weight percent of a copolymer of propylene (2 to about 79 mole percent) and butylene (98 to about 21 mole percent).

If skin layers (b) and/or (c) are not heat sealable, and that property is desired on one or both of those surfaces, then a heat sealable layer (d) may be applied to one or both of those surfaces. Heat sealable layer (d) may be, for example, vinylidene chloride polymer or an acrylic polymer; or it may be coextruded from any of the heat sealable materials described herein. Vinylidene chloride polymer or acrylic polymer coatings are preferred materials which may be applied to the exposed exterior surfaces of the skin layers.

It is preferred that all layers of the multi-layer film structures of the present invention be coextruded. Thereafter, the film is biaxially oriented. For example, when employing polypropylene for the core matrix and the skin layers and employing PBT as the void initiating particles, a machine direction orientation may be from about 4 to about 8 and a transverse orientation may be from 4 to about 10 times at a drawing temperature of about 100° C. to 170° C. to yield a biaxially oriented film. A preferred film thickness is from about 0.5 mil to about 3.5 mils.

The following specific examples are presented herein to illustrate particular embodiments of the present invention and hence are illustrative of this invention and not to be construed in a limiting sense.

Coefficient of friction values referred to herein are determined according to the procedure of ASTM D 1894-78, modified as follows: the film to film area of contact is 2 inches X 1 inch, instead of 2½ inches X 2½ inches. The mass of the sled is 100 grams rather than 200 grams and the sled speed is 6 inches per minute, the same as ASTM D 1894-78. Thus, the modified test is run at the condition of 50 grams/in.$^2$ rather than 32 grams/in.$^2$.

Haze and gloss values referred to herein are determined according to the procedures of ASTM D 1003-61 and D 2457-70 respectively.

EXAMPLE 1

The film of this example was produced for comparison with the films produced in accordance with the present invention.

A mixture of 92 percent, by weight, isotactic polypropylene (MP=320° F., melt index=3), containing 8 weight percent PBT (MP=440° F.) as the core layer void-initiating material, is melted in an extruder with a screw of L/D ratio of 20/1 to provide the core layer mixture. A second extruder, in association with the first extruder, is supplied with the same isotactic polypropylene as the first extruder (without PBT), this extruder used to provide the skin layer mixture. A melt coextrusion is carried out while maintaining the cylinder of the core polymer material at a temperature sufficient to melt the polymer mixture, i.e., from about 450° F. to about 550° F. or higher. The polypropylene mixture of the second extruder to be used to form the skin layers is maintained at about the same temperature as the polypropylene used in fabricating the core layer. The mixture of the second extruder is split into two streams to enable the formation of skin layers on each surface of the core layer. As may be appreciated by those skilled in the art, rather than splitting the output of the second extruder into two streams, a third extruder could be used to supply the second skin layer mixture. Such an arrangement would be desired when the material used to form the second skin layer is varied from that of the first skin layer, when the thickness of the second skin layer is varied from that of the first skin layer, etc.

A three-layer film laminate was coextruded with a core thickness representing about 80 percent of the overall extruded thickness, with the thicknesses of the skin layers representing about 20 percent of the film thickness. The resultant film sheet was subsequently oriented eight by about five and one-half times using a commercially available sequential biaxially orienting apparatus to provide a multi-layer film structure. The machine direction (MD) orientation is conducted at about 285° F. and the transverse direction (TD) orientation is conducted at about 300° F. The resultant multilayer film exhibits a lustrous, whit appearance and the following properties.

Film thickness:1.30 mills
Density:0.62 g/cc
Gloss:82%
Light transmission:22%
Coefficient of friction:0.80

EXAMPLE 2

The film of this example was also produced for comparison with the films produced in accordance with the present invention.

As in Example 1, a mixture of 92 percent, by weight, isotactic polypropylene (MP=320° F., melt index=3), containing 8 weight percent PBT (MP=440° F.), as the core layer void-initiating material, is melted in an extruder with a screw of L/D ratio of 20/1 to provide the core layer mixture. A second extruder, in association with the first extruder, is supplied with the same isotactic polypropylene as the first extruder, to which is added 4 percent TiO$_2$, this extruder used to provide the skin layer mixture. A melt coextrusion is carried out under the same conditions as used in Example 1. Again, the mixture of the second extruder is split into two streams to enable the formation of skin layers on each surface of the core layer.

A three-layer film laminate was coextruded with a core thickness again representing about 80 percent of the overall extruded thickness, with the thicknesses of the skin layers representing about 20 percent of the film thickness. The resultant film sheet was subsequently oriented eight by about five and one-half times using a commercially available sequential biaxially orienting apparatus to provide a multi-layer film structure. The machine direction (MD) orientation is conducted at about 285° F. and the transverse direction (TD) orientation is conducted at about 300° F. The resultant multi-layer film exhibits a pleasing appearance of higher whiteness than that of Example 1. The properties of the film so produced are as follows:
Film thickness:1.30 mills
Density:0.62 g/cc
Gloss:69%
Light transmission:21%
Coefficient of friction:0.46

EXAMPLE 3

A concentrate containing 90% by weight of a 4.5 melt index isotactic polypropylene and 10% by weight of Sipernat 44, a precipitated sodium-aluminum silicate of the following analysis, SiO$_2$ 42%, Al$_2$O$_3$ 36%, Na$_2$O 22%, having a 3.5 micron mean particle size, available from Degussa Chemical Company; is intimately melt-mixed in a Bolling mixer until the inorganic components are uniformly dispersed in the molten polypropylene. The melt concentrate is fed into a pelletizing extruder line and formed into a solid-pellet concentrate.

A second concentrate containing 90% by weight of a 4.5 melt index isotactic homopolymer polypropylene and 10% by weight Kaopolite 1152, a dehydrated kaolinire of the following analysis SiO$_2$ 55%, Al$_2$O$_3$ 44%, Fe$_2$O$_3$ 0.4%, having a 0.7 micron mean particle size is prepared in the same manner and also pelletized. The two pelletized concentrates are then melt-blended with additional isotactic polypropylene of 4.5 melt index, and after uniform mixing, the blend is formed into solid pellets. The composition is now 99.5% polypropylene, 2400 ppm Sipernat 44 and 3000 ppm by weight Kaopolite 1152.

A mixture of 92 percent, by weight, isotactic polypropylene (MP=320° F., melt index=4.5), containing 8 weight percent PBT (MP=440° F.), as the core layer void-initiating material, is melted in an extruder with a screw of L/D ratio of 20/1 to provide the core layer mixture. A second extruder, in association with the first extruder, is supplied with the same isotactic polypropylene as the first extruder, to which is added 4 percent TiO$_2$, this extruder used to provide the first skin layer mixture. A third extruder, in association with the first and second extruders, is supplied with the pellets produced as described above, having a composition of 99.5% polypropylene, 2400 ppm Sipernat 44 and 3000 ppm by weight Kaopolite 1152. The third extruder is used to provide the second skin layer mixture.

A three-layer film laminate was coextruded with a core thickness again representing about 80 percent of the overall extruded thickness, with the thicknesses of the first and second skin layers each representing about 10 percent of the film's overall thickness. The resultant film sheet was subsequently oriented eight by about five and one-half times using a commercially available sequential biaxially orienting apparatus to provide a multi-layer film structure. As in the previous examples, the machine direction (MD) orientation is conducted at about 285° F. and the transverse direction (TD) orientation is conducted at about 300° F. The resultant multi-layer film has a first side of higher whiteness than that of the film of Example 1 and a second side having an appearance substantially the same as that of Example 1. The properties of the film so produced are as follows:
Film thickness:1.20 mills
Density:0.62 g/cc
Gloss:90%
Light transmission:21%
Coefficient of friction:0.30

The coefficient of friction of the finished film not only is desirably low but also is stable over conditions which simulate typical converting operations involving temperatures reaching as high as 80° C. for three seconds. The percent gloss is considered to be remarkably good considering the excellent coefficient of friction and anti-block characteristics of the structure. Moreover, no blocking of slit rolls occured after three days at 60° C.

EXAMPLE 4

The structure of Example 3 is corona discharge treated on both sides thereof in order to improve wettability and adhesion by inks or other surface layers which may tend to have inferior wetting and adhesion in the absence of corona treatment. The finished film has the following characteristics.
Gloss:90%
Coefficient of friction:0.30

This film demonstrates that the coefficient of friction of the surface of the film from Example 3 is unaffected by corona discharge treatment. It is known that amide-modified polypropylene films significantly increase in coefficient of friction upon such treatment and must thereafter be conditioned to restore the coefficient of friction to useable levels. Again, no blocking of slit rolls occured after three days at 60° C.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the amended claims.

What is claimed is:

1. An opaque, biaxially oriented polymeric film structure, comprising:
   (a) a thermoplastic polymer matrix core layer having a first surface and a second surface, within which is located a strata of voids; positioned within a substantial number of said voids is at least one spherical void-initiating particle which is phase distinct and incompatible with said matrix material, the void space occupied by said particle being substantially less than the volume of said void, with one cross-sectional dimension of said particle at least approximating a corresponding cross-sectional dimension of said void; the population of said voids in said core being such as to cause a significant degree of opacity;

(b) a first thermoplastic polymer skin layer having a first surface and a second surface, said first surface of said first skin layer adhering to said first surface of said core layer, said first skin layer including up to about 12% by weight of an opacifying, titanium dioxide contact pigment; and (c) a second thermoplastic polymer skin layer having a first surface and a second surface, said first surface of said second skin layer adhering to said second surface of said core layer, said second skin layer including finely divided, uniformly dispersed inorganic material in an amount effective to impart antiblocking characteristics and decrease the inherent film-to-film coefficient of friction at said second surface of said second thermoplastic polymer skin layer;

wherein said skin layers are of a thickness such that the outer surface of said skin layers do not, at least substantially, manifest the surface irregularities of said matrix core layer.

2. The film structure of claim 1, wherein said inorganic material has a mean particle size of from about 0.2 to about 5.0 microns.

3. The film structure of claim 2, wherein said inorganic material is selected from the group consisting of aluminum silicate, sodium-aluminum silicate, dehydrated kaolinite and mixtures thereof.

4. The film structure of claim 3, wherein said core layer is fabricated from isotactic polypropylene.

5. The film structure of claim 4, wherein the void-initiating particles of said core layer comprise polybutylene terephthalate.

6. The film structure of claim 5, wherein said first and second skin layers are fabricated from isotactic polypropylene.

7. The film structure of claim 6, wherein said first skin layer contains from about 2% to about 6% by weight of $TiO_2$.

8. The film structure of claim 7, wherein said inorganic material is a silica-alumina ceramic particulate material in spherical form.

9. The film structure of claim 1, wherein said first or second skin layer is fabricated from a heat sealable material.

10. The film structure of claim 1, wherein said first or second skin layer is fabricated from a material selected from the group consisting of homopolymer of propylene, linear low density polyethylene, high density polyethylene, random copolymer of propylene and ethylene, block copolymer of propylene and ethylene, copolymer of propylene and butylene, terpolymer of ethylene, propylene and butene, terpolymer of ethylene, propylene and butylene, and mixtures thereof.

* * * * *